(12) United States Patent
Smith

(10) Patent No.: US 10,215,284 B2
(45) Date of Patent: Feb. 26, 2019

(54) FLOWLINE DIVERTOR SEAL WITH SPRING-ENERGIZED SEALING LIPS

(75) Inventor: Thomas R. Smith, Nacogdoches, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 183 days.

(21) Appl. No.: 13/885,410

(22) PCT Filed: Dec. 16, 2011

(86) PCT No.: PCT/US2011/065376
§ 371 (c)(1),
(2), (4) Date: May 15, 2013

(87) PCT Pub. No.: WO2012/096755
PCT Pub. Date: Jul. 19, 2012

(65) Prior Publication Data
US 2013/0234401 A1 Sep. 12, 2013

Related U.S. Application Data

(60) Provisional application No. 61/431,581, filed on Jan. 11, 2011.

(51) Int. Cl.
*F16J 15/32* (2016.01)
*E21B 33/03* (2006.01)
(Continued)

(52) U.S. Cl.
CPC ............... *F16J 15/32* (2013.01); *E21B 33/03* (2013.01); *F16J 15/166* (2013.01); *F16J 15/3232* (2013.01); *E21B 2033/005* (2013.01)

(58) Field of Classification Search
CPC ...... F16J 15/3404; F16J 15/406; F16J 15/344; F16J 15/3236; F16J 15/3212;
(Continued)

(56) References Cited

U.S. PATENT DOCUMENTS 2,437,901 A * 3/1948 Winkeljohn ............... 277/565
2,736,583 A * 2/1956 Marvin ..................... 277/573
(Continued)

FOREIGN PATENT DOCUMENTS

EP 0 360 946 A1 4/1990
GB 2 327 693 A 2/1999

OTHER PUBLICATIONS

Notification of Transmittal of The International Search Report and The Written Opinion of the International Searching Authority, or the Declaration, dated Apr. 2, 2012, in corresponding International Application No. PCT/US2011/065376.
(Continued)

*Primary Examiner* — Nathan Cumar
(74) *Attorney, Agent, or Firm* — Renner, Otto, Boisselle & Sklar, LLP

(57) ABSTRACT

A seal for installation within a flowline diverter assembly including a housing having a bore, and a spool received within the bore. The seal includes an annular body configured to be received between the spool and the bore. The body also has an inner diameter face disposable opposite the spool, and an outer diameter face disposable opposite the bore. The inner diameter face has a first and a second lip portion which are energizable responsive to fluid pressure. A generally annular first spring member is molded into the outer diameter face adjacent a first end face of the body, and a generally annular second spring member is molded into the body outer diameter face adjacent a second end face. Generally annular third and fourth spring members each also may be molded into a corresponding one of the body lip portions.

4 Claims, 3 Drawing Sheets

(51) Int. Cl.
*F16J 15/16* (2006.01)
*F16J 15/3232* (2016.01)
*E21B 33/00* (2006.01)

(58) Field of Classification Search
CPC ........ F16J 15/3208; F16J 15/322; F16J 15/32; F16J 15/166; F16J 15/3232; E21B 33/03; E21B 2033/005
USPC .................. 277/512, 500, 511, 510, 554, 549
See application file for complete search history.

(56) References Cited

U.S. PATENT DOCUMENTS

| | | | | |
|---|---|---|---|---|
| 2,751,235 | A * | 6/1956 | Watts et al. | 277/322 |
| 2,754,136 | A | 10/1956 | Phillips | |
| 4,288,083 | A * | 9/1981 | Braconier | F16J 15/3244 |
| | | | | 277/559 |
| 4,379,558 | A * | 4/1983 | Pippert | E21B 33/1216 |
| | | | | 277/536 |
| 4,858,936 | A * | 8/1989 | Adams | 277/306 |
| 5,421,591 | A * | 6/1995 | Katzensteiner | 277/550 |
| 5,890,535 | A * | 4/1999 | Petrash | E21B 33/03 |
| | | | | 166/120 |
| 7,828,300 | B2 * | 11/2010 | Munekata | 277/559 |
| 2002/0163136 | A1 * | 11/2002 | Schroeder | 277/549 |

OTHER PUBLICATIONS

Undated brochure entitled: "Orifice Plate Advantages and Benefits" from Pikotek. Applicants request the Examiner to consider this reference as prior art under 102(a), however, Applicants respectfully reserve the right to supplement this Information Disclosure Statement and take a contrary position should it be necessary.

Undated brochure entitled: "Ball Vavles" from A.S.T.—Apparecchi Di Sicurezza E Di Tenuta S.p.A. Applicants request the Examiner to consider this reference as prior art under 102(a), however, Applicants respectfully reserve the right to supplement this Information Disclosure Statement and take a contrary position should it be necessary.

* cited by examiner

FLOWLINE DIVERTOR SEAL WITH SPRING-ENERGIZED SEALING LIPS

CROSS-REFERENCE TO RELATED APPLICATIONS

The present application claims the benefit of the filing date of U.S. Provisional Application Ser. No. 61/431,581, filed Jan. 11, 2011, the disclosure of which is expressly incorporated herein by reference.

BACKGROUND OF THE INVENTION

The present invention relates broadly to seals for sealing an assembly including a housing having a bore and a generally annular element received within the bore, and more particularly wherein such assembly is a flowline diverter.

As further described, for example, in U.S. Pat. Nos. 5,890,535 and 6,290,231, flowline diverters are mounted to offshore drilling rigs below the rig floor for use in early stages of drilling. In basic construction, flowline diverters include a tubular support housing and a cylindrical spool. The housing has an axial bore and is mounted below the rig floor. The housing also has a lateral flowline outlet for directing gas, liquid, or other fluid flow when the diverter is closed. The spool is secured to the upper end of a riser, and is lowered through the rotary table of the rig to be received in the housing. The spool has lateral flow openings that align axially with the lateral flowline outlet.

A pair of seals is installed above and below the lateral flowline outlet to seal the spool to the diverter housing. Each of the seals is received in a corresponding gland defined between the bore of the housing and the spool. Passageways are provided in the spool in fluid communication with a corresponding one of the glands to receive a source of fluid pressure, such as hydraulic fluid or another liquid or gas media, for energizing the seals. As so energized, the seals prevent fluid flow from leaking between the diverter spool and the housing with the seal outer diameter sealing against the bore of the housing and the seal inner diameter sealing against the spool.

Some seals for diverters utilize rigid metal rings or end caps which are bonded to each end of an annular elastomeric body having a pair of annular lips formed along the inner diameter of the seal. The lips are energizable by the source of fluid pressure. The rings are employed to help prevent the seal from being extruded between the diverter bore and body.

BROAD STATEMENT OF THE INVENTION

The present invention is directed to a seal for sealing an assembly including a housing having a bore and a generally cylindrical element received within the bore. Such assembly may be a flowline diverter wherein the cylindrical element is the diverter spool.

The seal includes an annular body formed of an elastomeric polymeric material, and is configured to be receivable between the diverter spool and the bore of the housing such as within a gland of the spool. The seal body has a radial first end face, and a radial second end face spaced-apart axially from the first end face. The body also has an inner diameter face extending axially intermediate the first and the second end face and disposable opposite the spool, and an outer diameter face extending axially intermediate the first and second end face and being disposable opposite the housing bore. The inner diameter face has a first and a second lip portion each extending radially towards the spool. The lip portions are energizable responsive to fluid pressure received from a fluid passageway in the spool to sealingly engage the spool.

A generally annular first anti-extrusion spring member is molded into the body outer diameter face adjacent the body first end face, and a generally annular second anti-extrusion spring member is molded into the body outer diameter face adjacent the second end face. Generally annular first and second energizing spring members each also may be molded into a corresponding one of the body lip portions. Each of the first and the second anti-extrusion and energizing spring members may be formed of a metal or non-metal material. The provision of the molded-in first and second anti-extrusion spring members prevent the extrusion of the seal in the gap between the spool and the bore of the diverter, while the provision of the first and second energizing spring members function to assist in energizing the lip members.

The present invention, accordingly, comprises the design, fabrication, construction, combination of elements, and/or arrangement of parts and steps which are exemplified in the detailed disclosure to follow. Advantages of the flowline diverter seal of the invention include the elimination of the need for rigid end caps which results in weight reduction and more reliability in eliminating the potential for bond failure between the end caps and the seal body. Additional advantages include improved sealing function as a result of the spring energization of the sealing lips such that the lips can maintain contact with the spool even under offset conditions in the components of the diverter assembly. Further advantages include flexible anti-extrusion elements on the outside diameter of the seal that can move to seal the extrusion gap while the seal is under pressure. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
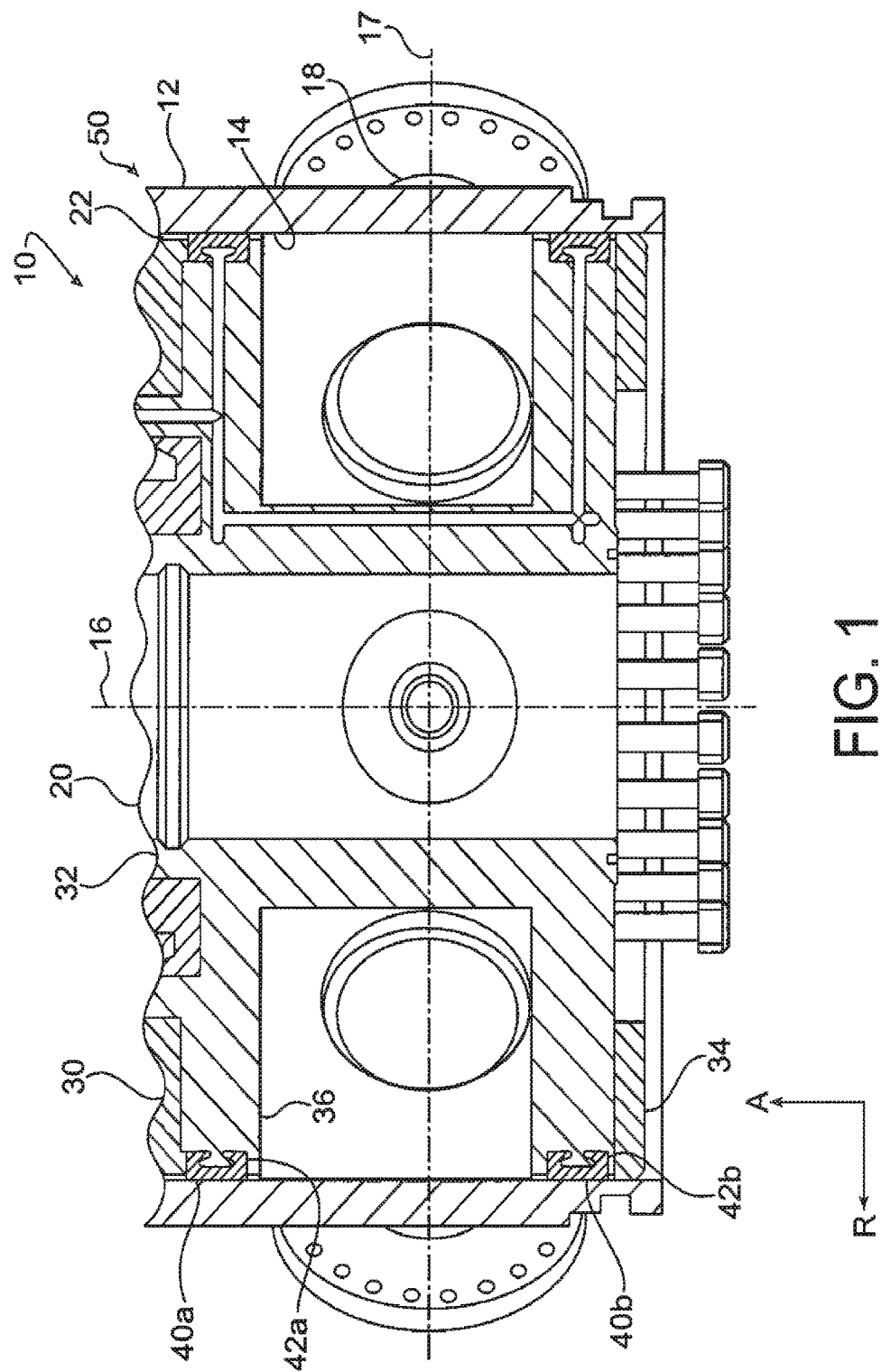
FIG. 1 is a cross-sectional, fragmentary view of a flowline diverter assembly including a pair of seals in accordance with the present invention.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid or other flow. Terminology of similar import other than the words specifically mentioned above likewise is to be considered as being used for purposes of convenience rather than in any limiting sense. In certain views of the figures, the axial or longitudinal direction may be shown by an arrow labeled "A," and the radial direction may be shown by an arrow labeled "R." The terms "axial" and "longitudinal" may be used interchangeably.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

For illustrative purposes, the precepts of the flowline diverter seal herein involved are described in connection with its use within a flowline diverter assembly which is mountable to a drilling rig below the floor of the rig. It should be appreciated, however, that aspects of the present invention may find utility in other applications. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, a representative flowline diverter assembly is referenced generally at 10 in FIG. 1. Diverter 10 includes a generally tubular support housing, 12, which is mountable to the floor of a drilling rig (not shown), and which has an axial bore, 14, therethrough which extends along a central longitudinal assembly axis, 16, which is perpendicular to a radial assembly axis, 17. At least one lateral flowline outlet, 18, opens into in housing 12 for directing fluid flow when diverter 10 is closed. A generally cylindrical diverter spool, 20, which may be secured to the upper end of a drilling riser (not shown) is disposed coaxially in bore 14 and is spaced-apart radially therefrom to define an annular gap, 22, therebetween. Spool 20 may be of a multi-piece construction which may include upper, central, and lower portions, 30, 32, and 34, respectively. Spool central portion 32 has a circumferential recess, 36, formed in the outer diameter thereof which communicates with outlet 18 for providing flow from one or more port openings, one of which is shown at 38 as being radially aligned in fluid communication with outlet 18.

A pair of flowline diverter seal rings, an upper one of which is referenced at 40a, and a lower one of which is referenced at 40b, in accordance with the present invention each is mounted in a corresponding one of pair of generally rectangular annular grooves or glands, 42a-b. Each of glands 42 is defined in, such as between spool upper and central portions 30 and 32 for gland 42a, and between spool central and lower portions 32 and 34 for gland 42b, and extends circumferentially around spool 20.

Figure 3:
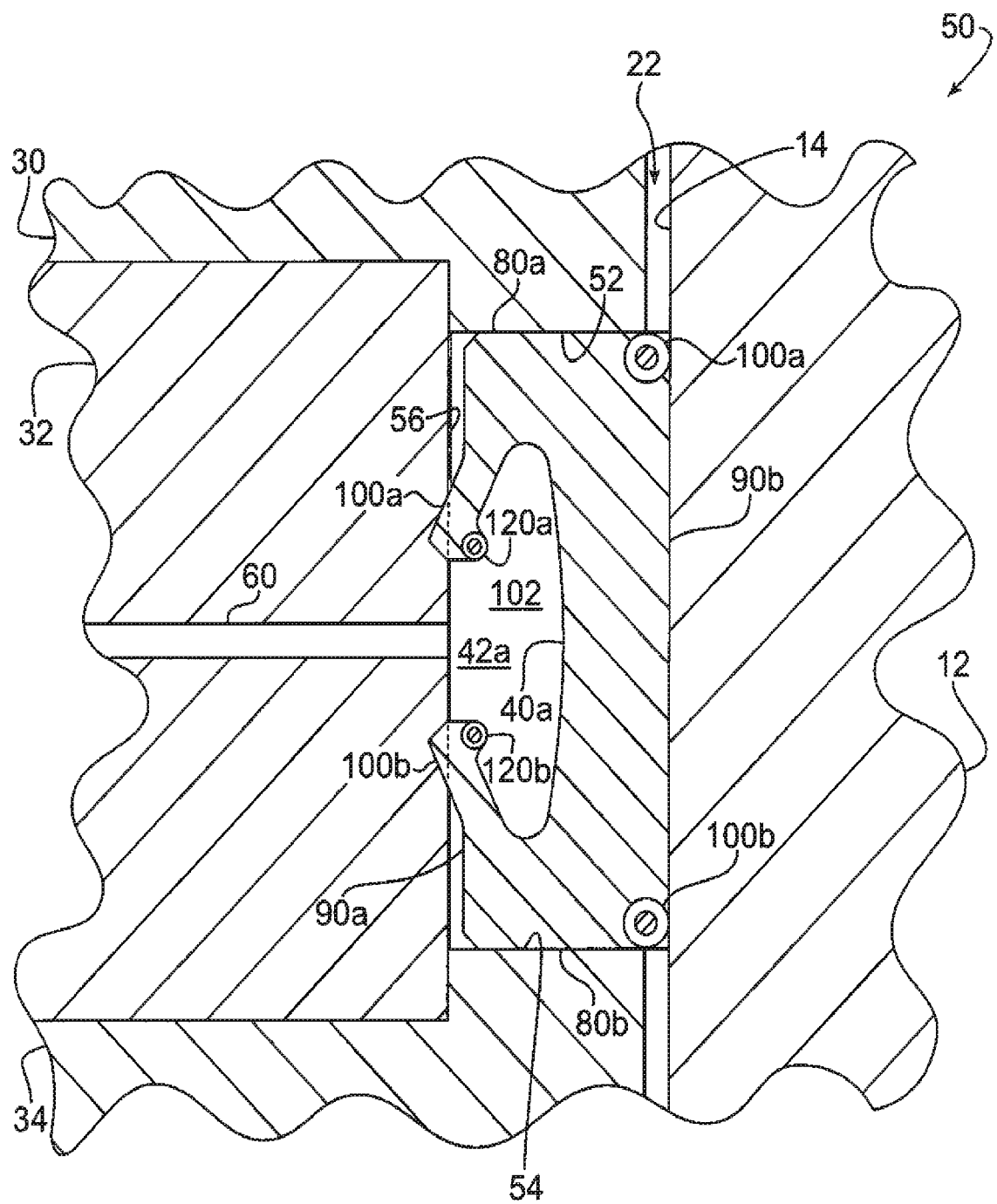
FIG. 3 is a magnified view of a detail of FIG. 1 showing the installation of one of the seals in the diverter assembly.

As may be better appreciated with additional momentary reference to FIG. 3 wherein the detail referenced at 50 in FIG. 1 is depicted in enhanced detail, as may be seen for gland 42a, each of the glands 42 may have a first or upper end wall, 52, and a second or lower end wall, 54, spaced-apart axially from first end wall 52, and a peripheral sidewall, 56, extending axially between the first and second end walls 52 and 54, and radially circumferentially about assembly axis 16. Peripheral end wall 56 has fluid passageway, 60, opening thereinto for providing a source of fluid pressure, such as hydraulic fluid or another liquid or gas media, for energizing the seals 40.

Figure 2:
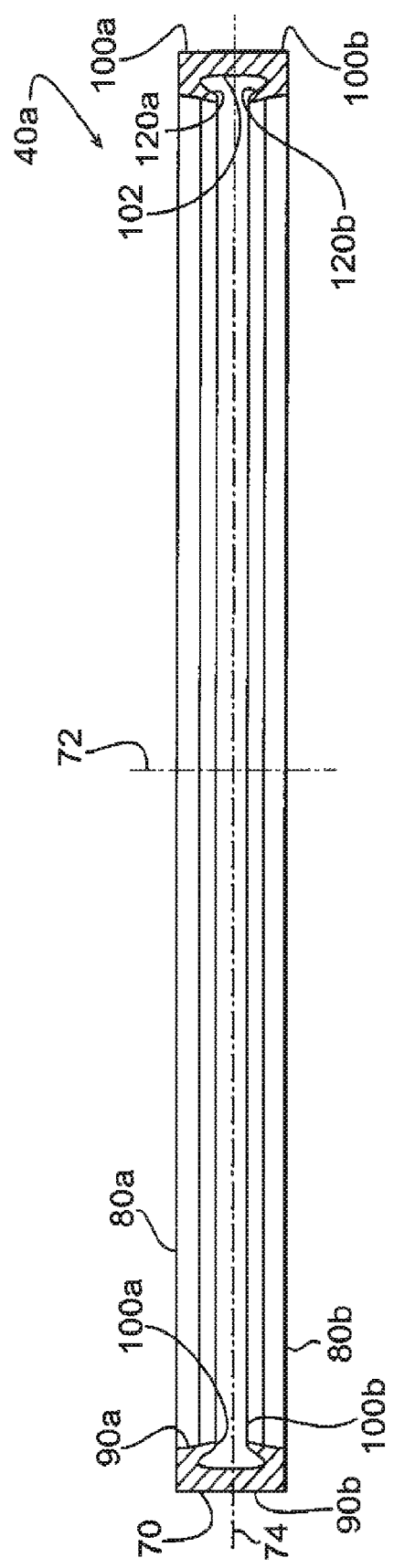
FIG. 2 is a longitudinal cross-sectional view of one of the seals of FIG. 1.

Looking now to FIG. 2 wherein a cross-sectional view of seal ring 40a is shown, each of the rings 40 has a generally annular body, 70, which may be molded or otherwise formed of an elastomeric polymeric material. Body 70 extends circumferentially around a central longitudinal seal axis, 72, which is perpendicular to a radial seal axis, 74, and is configured to be receivable within a gland 42 (FIGS. 1 and 3) coaxially with assembly axis 16 intermediate bore 14 and spool 20. With additional reference again to FIG. 3, body 70 has a radial first end face, 80a, disposable opposite the gland first end wall 52 (FIG. 3), and a radial second end face, 80b, spaced-apart axially from first end face 80a and disposable opposite the gland second end wall 54. Body 70 also has radially spaced-apart inner and outer diameter faces, 90a and 90b, respectively, each of which extends axially intermediate the first and second end faces 70a-b. Inner diameter face 90a is disposable in gland 42 (FIGS. 1 and 3) opposite spool 20, with outer diameter face 90b being so disposable opposite bore 14.

With reference to seal ring 40a as mounted within gland 42a (FIGS. 1 and 3), inner diameter face 90a has a first lip portion, 100a, which extends radially therefrom towards spool 20, and a second lip portion, 100b, axially spaced-apart from first lip portion 100a to define a recess, 102 therebetween, and extending radially from inner diameter face 90a towards spool 20. In service, seal lip portions 100a-b are energizable responsive to fluid pressure received in recess 102 from fluid passageway 60 (FIGS. 1 and 3) to sealingly engage the gland sidewall 56 (FIG. 3).

With continued reference to FIGS. 2 and 3, seal ring 40a further is formed as including generally annular first and second anti-extrusion spring members, 110a and 110b, respectively, each of which extends circumferentially around seal axis 72. First spring member 110a is molded into body outer diameter face 90b adjacent body first end face 80a. Second spring member 110b, in turn, is molded into body outer diameter face 90b adjacent body second end face 80b.

As shown, seal ring 40a still further may be formed as including generally annular first and second energizing spring members, 120a and 120b, respectively, each of which extends circumferentially around seal axis 72. First energizing spring member 120a is molded into the body first lip portion 100a, with second energizing spring member being molded into the body second lip portion 100b. Each of the anti-extrusion spring members 110 and the energizing spring members 120 may be of a coiled ring, i.e., garter, type, and may be formed, independently, of a metal or non-metal material.

As illustrated in FIG. 3 for seal ring 40a, with ring 40a being installed in gland 42a, seal lip portions 100a-b may be appreciated to be self-energized to sealingly engage the gland sidewall 56 by virtue of the first and second energizing spring members 120a-b. Upon the further energization of lip portions 100a-b responsive to fluid pressure received in recess 102 from fluid passageway 60, the seal outer diameter face 90b sealingly engages bore 14, with the first and second anti-extrusion spring members 110a-b sealing gap 22 on opposite ends of the seal ring 40a to prevent the seal body 70 from being extruded into the gap 22.

Materials of construction for seal rings 40 of the present invention are to be considered conventional for the applications involved. Such materials generally will be corrosion resistant and otherwise selected for compatibility with the fluid or fluids being handled and/or for desired mechanical, thermal, or other physical properties. Spring members may be formed of a metal or metal alloy such as steel, stainless steel, brass, or bronze, or of a non-metal material such as a plastic. Seal body 70 may be formed of an elastomer such as a polyurethane, silicone, nitrile, HNBR, or fluoroelastomer.

As it is anticipated that certain changes may be made in the present invention without deputing from the precepts herein involved, it is intended that all matter contained in the foregoing description shall be interpreted as illustrative and not in a limiting sense. All references including any priority documents cited herein are expressly incorporated by reference.

What is claimed is:

1. A seal for installation within an assembly including a housing having a generally annular bore which extends along a central longitudinal assembly axis, and a generally cylindrical element disposed coaxially in the bore and radially spaced-apart therefrom to define a gap therebetween, the assembly having a gland defined between the element and the bore, the gland having a first end wall and a second end wall spaced-apart axially from the first end wall, and the gland having a peripheral sidewall extending axially between the first and the second end wall and radially circumferentially about the assembly axis, the peripheral sidewall having fluid passageway opening thereinto for providing a source of fluid pressure, the seal comprising:

a generally annular body formed of an elastomeric polymeric material, the body extending around a central longitudinal seal axis and configured to be receivable within the gland coaxially with the assembly axis intermediate the bore and the element, the body having a radial first end face disposable opposite the gland first end wall, and a radial second end face spaced-apart axially from the first end face and disposable opposite the gland second end wall, and the body having an inner diameter face extending axially intermediate the first and the second end face and disposable opposite the element, and an outer diameter face spaced-apart radially from the inner diameter face and extending axially intermediate the first and second end face and being disposable opposite the bore, the inner diameter face having a first lip portion extending radially therefrom towards the element, and a second lip portion axially spaced-apart from the first lip portion and extending radially from the inner diameter face towards the element, the first and the second seal lip being energizable responsive to fluid pressure received from the fluid passageway to sealingly engage the sidewall of the gland;

a generally annular first coiled spring anti-extrusion member extending around the longitudinal seal axis, the first anti-extrusion spring member being embedded into the body outer diameter face adjacent the body first end face;

a generally annular second coiled spring anti-extrusion member extending around the longitudinal seal axis, the second anti-extrusion spring member being embedded into the body outer diameter face adjacent the second end face;

a generally annular first energizing coiled spring member extending around the longitudinal seal axis, the first energizing spring member being embedded into the body first lip portion, and the body first lip portion being energized by the first energizing spring member to engage the gland sidewall; and a generally annular second energizing coiled spring member extending around the longitudinal seal axis, the second energizing spring member being embedded into the body second lip portion, and the body second lip portion being energized by the second energizing spring member to engage the gland sidewall in the absence of said fluid pressure, whereby with the seal being under pressure in the assembly, the first and the second anti-extrusion spring member seal the gap on opposite ends of the seal to prevent the seal body from being extruded into the gap.

2. The seal ring of claim 1 wherein the assembly is a flowline diverter and the element is a spool.

3. An assembly comprising:

a housing having a generally annular bore which extends along a central longitudinal assembly axis;

a generally cylindrical element disposed coaxially in the bore and radially spaced-apart therefrom to define a gap therebetween, the assembly having a gland defined between the element and the bore, the gland having a first end wall and a second end wall spaced-apart axially from the first end wall, and the gland having a peripheral sidewall extending axially between the first and the second end wall and radially circumferentially about the assembly axis, the peripheral sidewall having fluid passageway opening thereinto for providing a source of fluid pressure; and a seal comprising:

a generally annular body formed of an elastomeric polymeric material, the body extending around a central longitudinal seal axis and within the gland coaxially with the assembly axis intermediate the bore and the element, the body having a radial first end face disposed opposite the gland first end wall, and a radial second end face spaced-apart axially from the first end face and disposed opposite the gland second end wall, and the body having an inner diameter face extending axially intermediate the first and second end face and disposed opposite the element, and an outer diameter face spaced-apart radially from the inner diameter face and extending axially intermediate the first and the second end face and being disposed opposite the bore, the inner diameter face having a first lip portion extending radially therefrom towards the element, and a second lip portion axially spaced-apart from the first lip portion and extending radially from the inner diameter face towards the element, the first and the second seal lip being energizable responsive to fluid pressure received from the fluid passageway to sealingly engage the sidewall of the gland;

a generally annular first anti-extrusion coiled spring member extending around the longitudinal seal axis, the first anti-extrusion spring member being embedded into the body outer diameter face adjacent the body first end face;

a generally annular second anti-extrusion coiled spring member extending around the longitudinal seal axis, the second anti-extrusion spring member being embedded into the body outer diameter face adjacent the second end face;

a generally annular first energizing coiled spring member extending around the longitudinal seal axis, the first energizing spring member being embedded into the body first lip portion, and the body first lip portion being energized by the first energizing spring member to engage the gland sidewall; and a generally annular second energizing coiled spring member extending around the longitudinal seal axis, the second energizing spring member being embedded into the body second lip portion, and the body second lip portion being energized by the second energizing spring member to engage the gland sidewall in the absence of said fluid pressure, whereby with the seal being under pressure in the assembly, the first and the second anti-extrusion spring member seal the gap on opposite ends of the seal to prevent the seal body from being extruded into the gap.

4. The assembly of claim 3 wherein the assembly is a flowline diverter and the element is a spool.

\* \* \* \* \*